H. A. SEKOWSKY.
CARBURETER.
APPLICATION FILED DEC. 19, 1910.

1,002,458.

Patented Sept. 5, 1911.
5 SHEETS—SHEET 1.

Witnesses
R. L. Farrington.
J. D. Bremer

Inventor
Hermann A. Sekowsky
By Ensign & Wheeler
Attorneys

H. A. SEKOWSKY.
CARBURETER.
APPLICATION FILED DEC. 19, 1910.

1,002,458.

Patented Sept. 5, 1911.
5 SHEETS—SHEET 2.

Witnesses
R. L. Farrington
J. L. Bremer.

Inventor
Herman A. Sekowsky
By Endre & Wheeler
Attorneys.

H. A. SEKOWSKY.
CARBURETER.
APPLICATION FILED DEC. 19, 1910.

1,002,458.

Patented Sept. 5, 1911.

5 SHEETS—SHEET 4.

Witnesses

Inventor
Hermann Sekowsky
By Enros & Wheeler
Attorneys

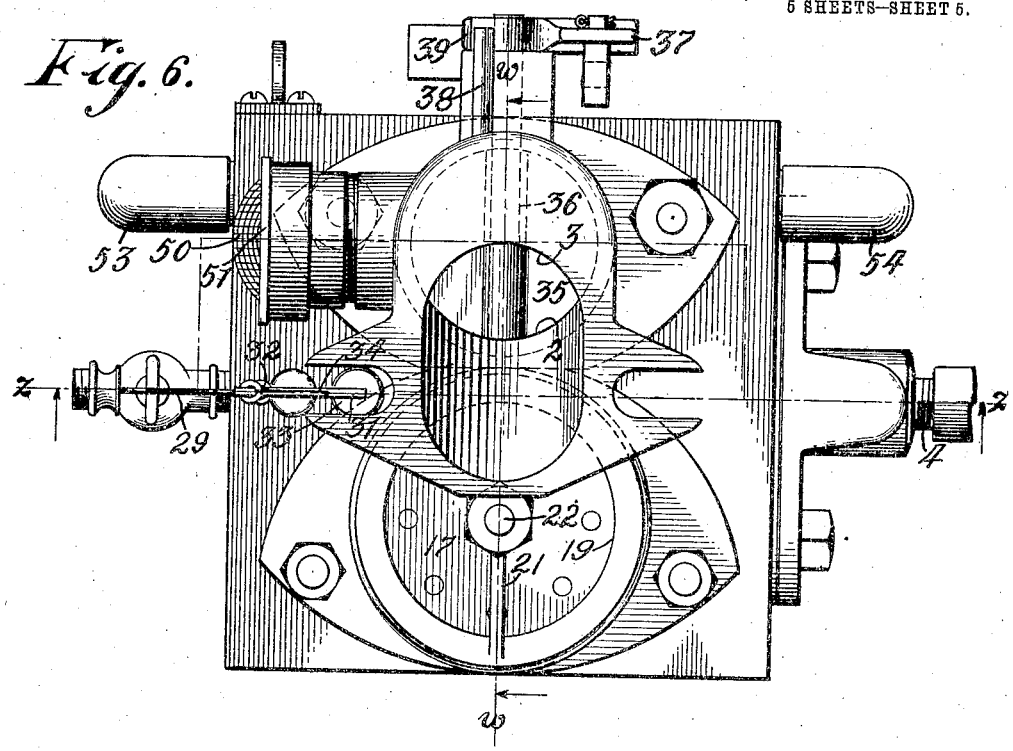
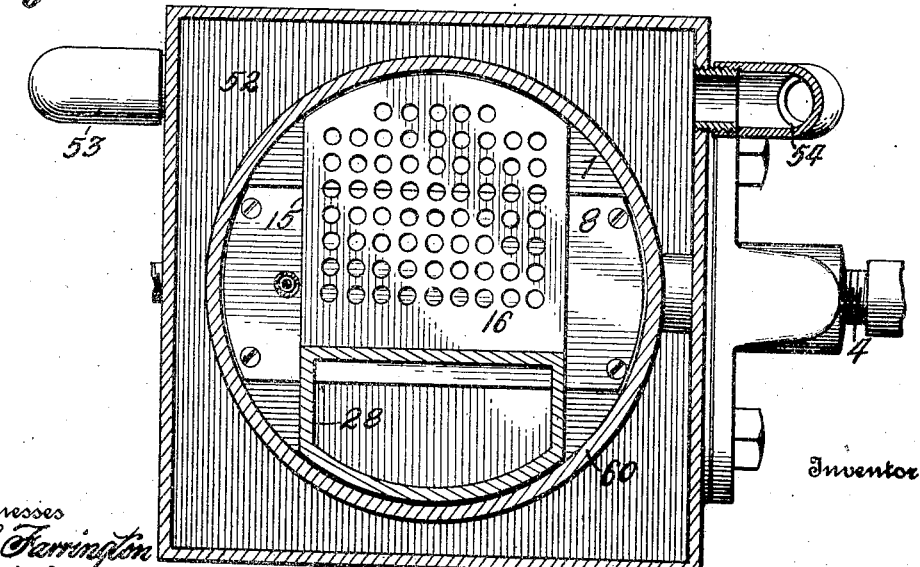

1,002,458. CARBURETER. HERMANN A. SEKOWSKY, Milwaukee, Wis., assignor to Loeffelholz Company, Milwaukee, Wis., a Corporation of Wisconsin. Filed Dec. 19, 1910. Serial No. 598,194.

*To all whom it may concern:*

Be it known that I, HERMANN A. SEKOWSKY, a citizen of the United States, residing at Milwaukee, county of Milwaukee, and State of Wisconsin, have invented new and useful Improvements in Carbureters, of which the following is a specification.

My invention relates to improvements in carbureters, and it pertains more especially to that class which is adapted to be used with automobiles.

The object of my improvement is, among other things, 1st, to provide a gas generator by which a minimum quantity of the combustible fluid is withdrawn from the reservoir and acted upon at any one time, whereby the loss and injurious effects of shaking and jostling a large volume of liquid incident to traveling over rough roads, as is usually the case with automobiles, is avoided, and whereby substantially all of the liquid fuel which is withdrawn from the reservoir is vaporized and burned; 2nd, to provide means for so thoroughly commingling the vapor with the air in the proper proportions that a more perfect combustion than heretofore is attained, whereby all noxious and disagreeable odors from the burning of the fuel is prevented and the fuel is used with the greatest economy; and 3rd, to so construct the operative mechanism of the carbureter that all parts will automatically adjust themselves to coöperate under all the varying conditions to which the apparatus is subjected and the necessity of manually regulating the device is avoided.

The construction of my invention is further explained by reference to the accompanying drawings, in which—

Figure 1:
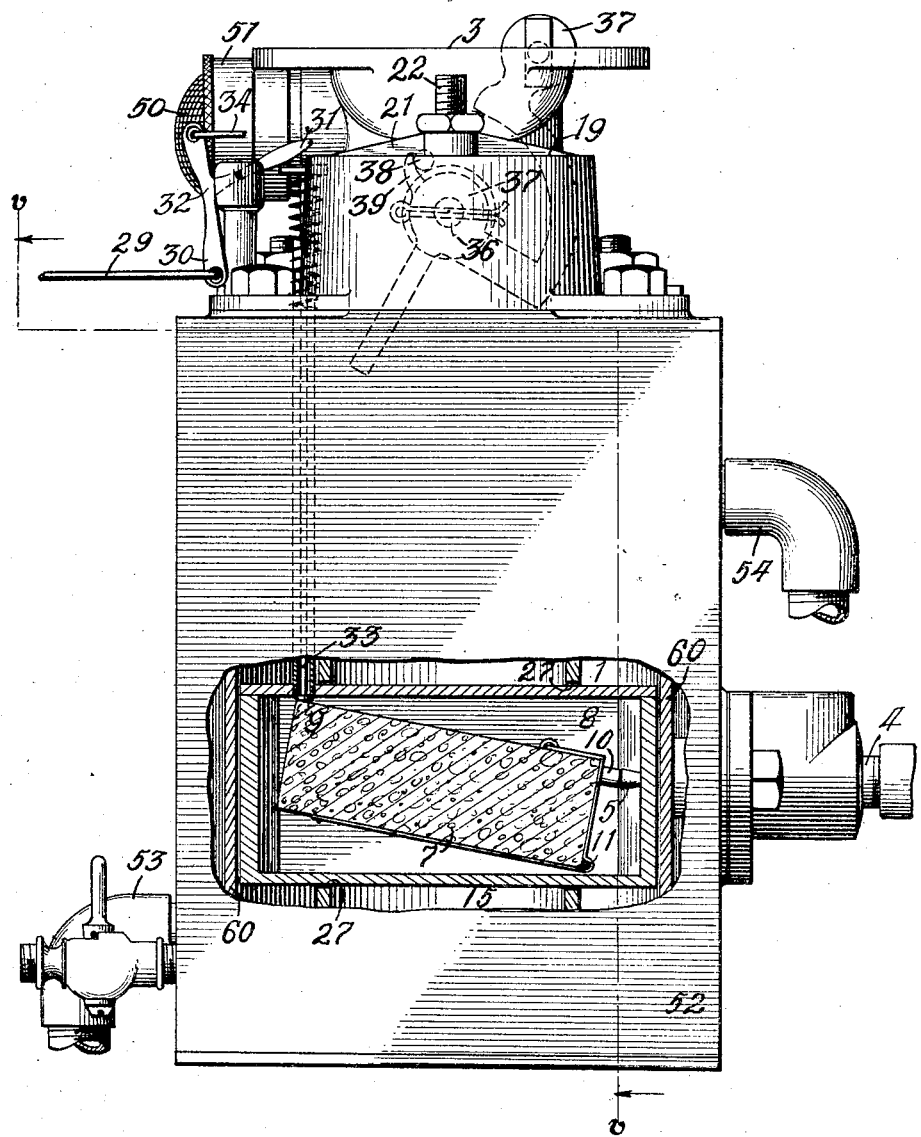
Figure 2:
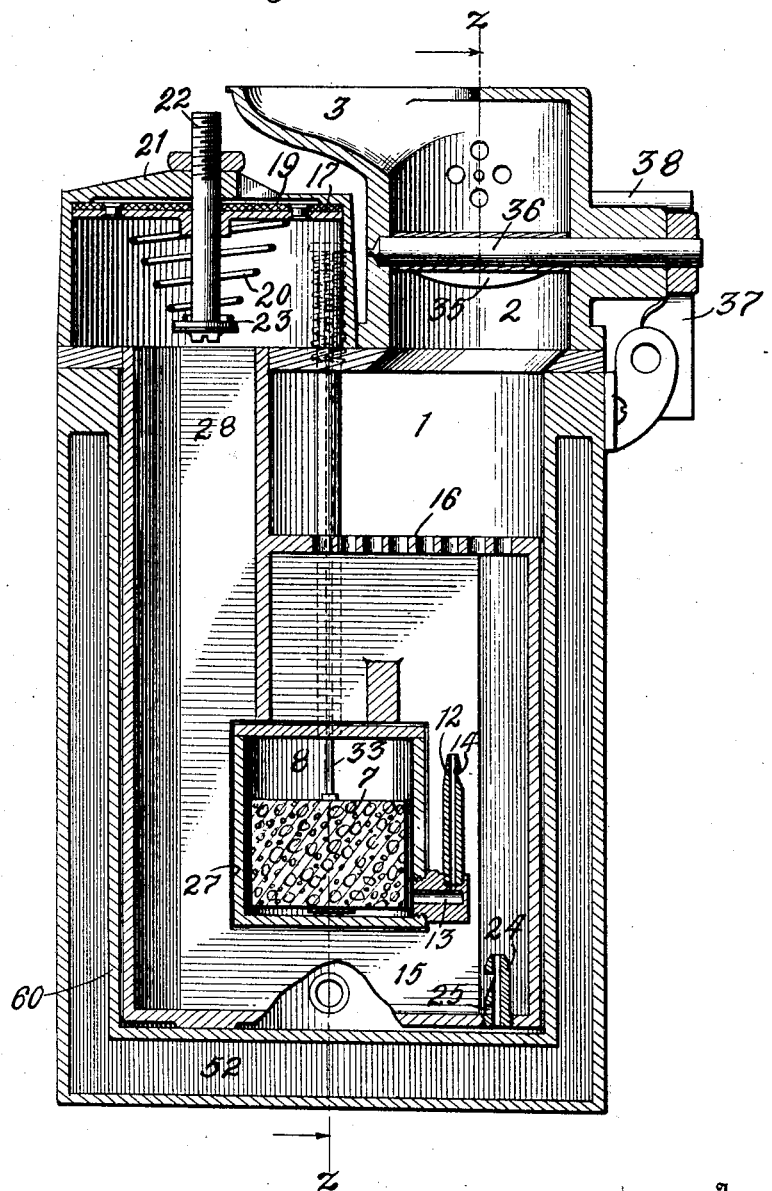
Figure 3:
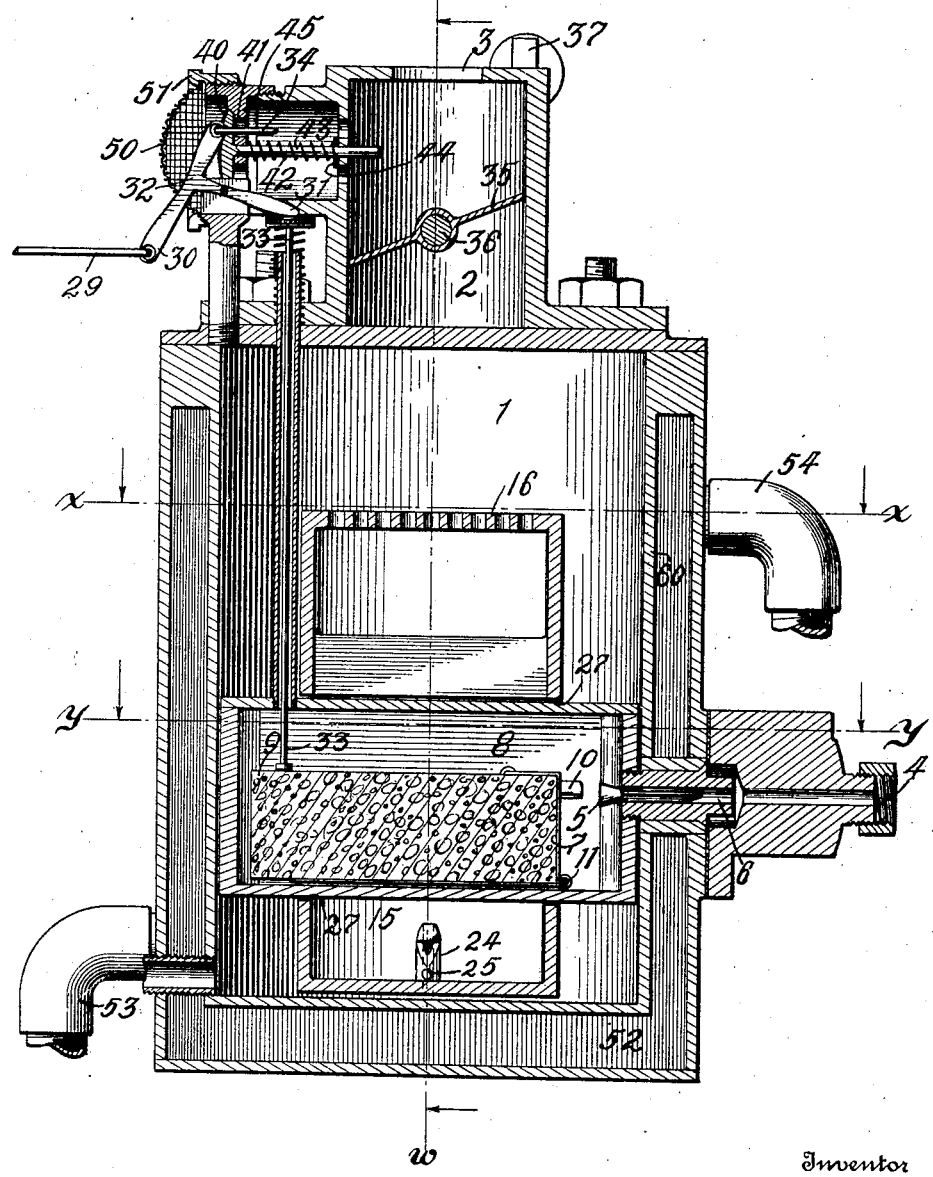
Figure 4:
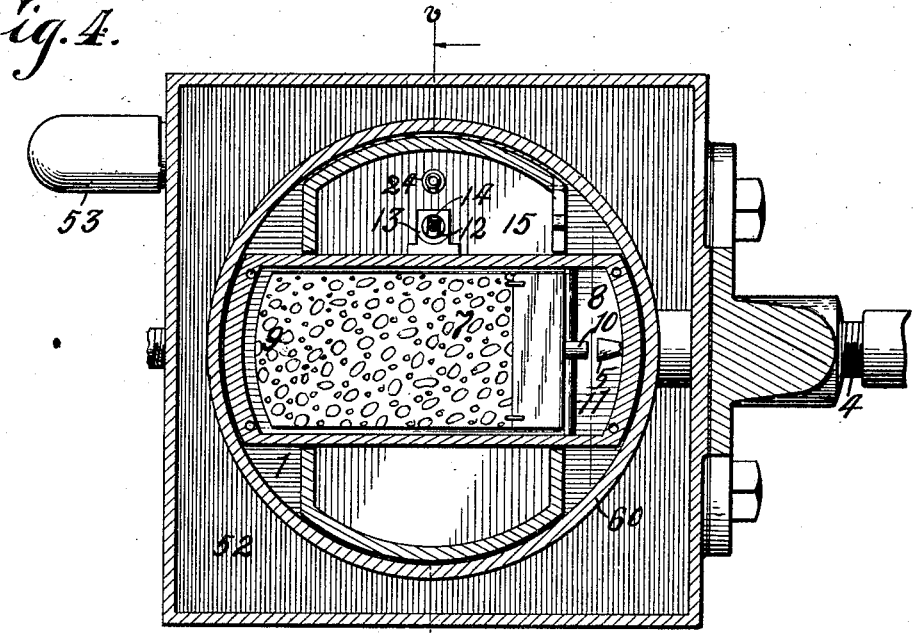
Figure 5:
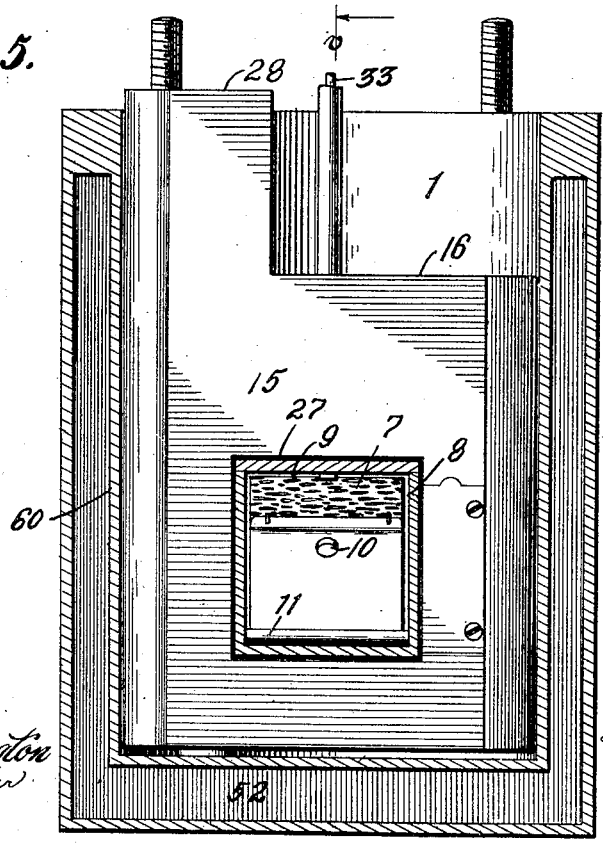

Figure 1 represents a side view, part broken away, to show the interior construction. Fig. 2 is a vertical section, drawn on line $w-w$ of Figs. 3 and 6. Fig. 3 is a vertical section, drawn on line $z-z$ of Figs. 2 and 6. Fig. 4 is a transverse section, drawn on line $y-y$ of Fig. 3. Fig. 5 is a vertical section, drawn on line $v-v$ of Fig. 1. Fig. 6 is a top view, and Fig. 7 is a transverse section, drawn on line $x-x$ of Fig. 3.

Like parts are identified by the same reference numerals throughout the several views.

1 represents the mixing chamber of the carbureter, which is connected with the cylinder of an engine, through the valve chamber 2 and ordinary tubing not shown, which tubing communicates with the valve chamber 2 through the outlet port 3.

4 is a duct which communicates between the carbureter and a reservoir of gasolene or other liquid fuel, with which the carbureter is supplied.

5 is an inward opening check valve, which is adapted to close the inner end of the liquid duct 6 as the same is forced to its seat by the upward movement of the float 7. It will be understood that said valve 5 is adapted to be opened by the pressure of the inflowing liquid against it until the float chamber 8 is filled to the desired point with liquid. When, however, the float chamber 8 is filled to the desired point, the free end 9 of the float is buoyed up thereby, whereby the contact member 10 of the float is brought against the end of the valve 5, said valve 5 is forced to its seat and the flow of liquid stopped. The float 7 is pivotally connected with the bottom of the float chamber 8 by the hinge member 11. It will be understood that with the back stroke of the piston in the cylinder of the engine, a partial vacuum is formed in the carbureter, whereby a small quantity of liquid is caused to flow from the reservoir, not shown, into the float chamber 8, and that as the float chamber becomes partially filled with liquid, the front end 9 of the float is caused to move upward by the buoyancy of the liquid when the valve 5 is closed, as stated, and the further admission of liquid is prevented.

The float chamber 8 is preferably made of comparatively small dimensions, but slightly larger than the float, whereby the float is brought into close proximity with the walls of the chamber, and whereby a small quantity of liquid only is required to fill such chamber around the float to and above the level of the outlet duct 12, through which the liquid escapes from the float chamber. The outlet duct is connected with the float chamber through the horizontal duct 13 and said duct 12 is preferably, provided with an inlet air port 14, whereby a small quantity of air is drawn into said duct 12 as the liquid escapes therefrom. As the liquid escapes from the duct 12, it descends of its own gravity to the bottom of the inlet air chamber 15, and is thereby distributed in a thin sheet over the entire bottom of the inlet air chamber 15, when it becomes rapidly vaporized by the upward current of air above and around it, when the vaporized liquid together with the air which is simultaneously admitted to the receptacle with each back stroke of the piston, passes from the chamber 15 upward and around the inlet duct 12, thence through the perforated or screened wall 16 and thence, as stated, through the valve chamber 2 to the cylinder of the engine, while a strong current of air is simultaneously admitted to the carbureter with each back stroke of the piston through the downwardly opening valve 17, which valve is adapted to close the inlet air port 19 of the carbureter. The valve 17 is supported in contact with its seat by the spiral spring 20 and said spring 20 is supported from one of the radial arms 21 above the port 19 by the vertical bolt 22 and bolt head 23. Thus it will be understood that by the same movement of the piston which causes the liquid to flow into the carbureter through the duct 6, a quantity of exterior air will simultaneously be caused to enter the carbureter through the spring supported valve 17 and that with the reverse movement of the piston, the inlet duct 6 is closed by the valve 5, while the inlet air duct 19 is simultaneously closed by the valve 17.

To accelerate the vaporization of the gasolene, I have provided a duct 24, which duct is provided with a minute aperture 25, through which when priming the carbureter, a small quantity of the gasolene or other liquid flows from the inlet air chamber to the mixing chamber, whereby a thin film of liquid is exposed to the action of the air along the bottom of both the air chamber and the mixing chamber and between it and the under side of the air chamber, which liquid is rapidly converted into vapor. When, however, the motor is started, a partial vacuum is formed in the chamber 15, which causes the vaporized gasolene as it is expanded by vaporization, to pass up through the duct 24 into the air chamber and from thence to the mixing chamber until such liquid is all vaporized and drawn back into the air chamber through said duct 24. It will, of course, be understood, that when the engine is in operation, the required quantity of gas will be generated with each stroke of the piston as the gasolene passes from the float chamber into the air and mixing chambers. It will be understood that a quantity of gasolene will still remain in the bottom of the chamber 15, after a portion of it has flowed into the bottom of the chamber 1.

For convenience of construction, the chamber 15 is formed with a horizontal opening 27 for the reception of the float chamber 8, which is inserted in such transverse opening, as shown in Fig. 3, when such chamber 15, together with the float chamber are inserted from the top of the mixing chamber 1. It will be understood that the side passage 28 of the chamber 15 forms an inlet duct for the passage of air and the same communicates with the inlet air port 19 at the top of the carbureter, whereby it is obvious that the air in its course from the inlet valve passes first downwardly through the passage 28, thence beneath the float chamber 8, thence upwardly around the duct 12, where it is commingled with the escaping liquid and vapor, thence out through the screened partition 16 and thence out through the valve chamber 2 and outlet port 3 to the engine, whereby the air and vaporized liquid becomes thoroughly commingled together, before passing to the engine in which condition the most perfect combustion takes place.

Preparatory to starting the engine, the valve 5 is released by the manual action of the operator, motion being communicated from the operator to the valve 5 by drawing the valve rod 29 toward the left. When the valve rod 29 is drawn toward the left, motion is communicated therefrom to the float through the arms 30 and 31 of the elbow crank lever 32, whereby the arm 31 is forced downwardly upon the upper end of the rod 33, when the lower end of said rod is caused to bear upon the rear end of 9 of the float, whereby the rear end of the float 9 is forced down from the position shown in Fig. 1 to that shown in Fig. 3, and whereby the valve 5 is released from contact with the float, when said valve is thrown to the open position by the pressure of the combustible liquid against it. The float is retained in its lower position until the required liquid is admitted for producing the initial action of the engine when the valve rod 29 is released and the rear end 9 of the float is free to rise whereby the further admission of liquid is prevented until the demands of the engine require additional liquid.

34 is an additional valve rod, which is provided simply to enable the operator to operate the device from the opposite side of the carbureter in case circumstances should so require.

35 is a damper of ordinary construction, which is pivotally supported in the valve chamber 2 upon the transversely arranged rod 36 and said rod 36 is provided upon its exterior protruding end with an operating lever 37, by which it is opened and closed.

38 is a stop pin, which is rigidly supported from the side of the valve chamber 2 and against which the contact bearing 39 of the operating lever 37 is brought as the valve 35 is closed.

40 is a safety valve, which is adapted to close the port 41 and said valve is retained in its closed position by a spiral spring 42, said spring being supported from the valve rod 43 and is adapted to bear at one end against the pin 44 and at its opposite end against the transversely arranged member 45 of the valve seat. The object of the safety valve is to provide for the escape of gas in case of an explosion of the same, by accidentally igniting in the valve chamber 2. The valve 40 is preferably inclosed with a wire screen 50 of ordinary construction, and the same is retained in place over and around the valve port by the screw threaded collar 51. 52 is a water jacket of ordinary construction, into which water is led from the supply through the duct 53. When it becomes heated, it rises and passes out through the duct 54, whereby the carbureter is prevented from becoming excessively heated.

Experience has demonstrated that by thus providing a float chamber of small dimensions and a float which occupies the greater part of the float chamber, a small quantity of gasolene or other liquid fuel only is admitted to the carbureter at a time, and that by thus admitting a small quantity only at a time, the waste and loss incident to supplying large volumes of liquid is avoided and the liquid is more perfectly vaporized, while a less quantity of the liquid is necessary to operate the float. Experience has also proved that by thus admitting a small quantity of liquid only at a time, it is more thoroughly acted upon by the air and more thoroughly vaporized and that the loss from the accumulation of heavy refuse matter heretofore experienced, where larger volumes of liquid are admitted to the carbureter at a time is avoided.

Attention is called to the fact that all the several coöperating parts by which the admission of the liquid to the float chamber are controlled, are non-adjustable, and are acted upon solely by the buoyancy of the liquid admitted and consequently the apparatus is not subject to variation and defective operation, as is frequently the case where such parts are subject to change by manual adjustment.

For convenience of description, all that part of the carbureter comprising the inclosing walls 60 is referred to as the mixing chamber, all that part of the receptacle within the walls of the mixing chamber is referred to as the inlet air chamber and the other chamber in which the float is located, is referred to as the float chamber, the same being supported within the inlet air chamber and that each of said three chambers are formed separately; that the air chamber is supported from and within the mixing chamber and the float chamber is supported from and within the inlet air chamber, and the inlet air chamber and float chamber are adapted to be inserted from the top of the mixing chamber, substantially as shown in Figs. 2 and 3.

Having thus described my invention, what I claim as new, and desire to secure by Letters Patent, is—

1. In a carbureter of the described class, the combination of a mixing chamber, an inlet air chamber, a float chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float.

2. In a carbureter of the described class, the combination of a mixing chamber, an inlet air chamber, a float chamber, a float located in and hinged at one end to said float chamber, an inlet liquid duct communicating through said mixing chamber with said float chamber, a liquid controlling valve located in said duct and adapted to be opened by the pressure of the liquid therein, said float being adapted as one end is raised by the buoyancy of the surrounding liquid to contact with and close said valve, said float being adapted as the liquid subsides, to move out of contact with said valve, when said valve is opened by the pressure of liquid independently of the action of said float.

3. In a carbureter of the described class, the combination of a mixing chamber, an inlet air chamber, a float and chamber therefor located partially within said air chamber, means for manually depressing said float from the exterior, whereby the initial quantity of liquid is admitted to said chamber for priming the carbureter preparatory to starting the engine, an inlet liquid duct communicating through said mixing chamber with said float chamber, a liquid controlling valve located within said duct, said valve being adapted to be normally opened by the passage of liquid in said duct and closed by the action of said float.

4. In a carbureter of the described class, the combination of a mixing chamber, an inlet air chamber, a float chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float, and an overflow duct communicating from the float chamber with the inclosing inlet air chamber.

5. In a carbureter of the described class, the combination of a mixing chamber, an inlet air chamber, a float chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float, and an overflow duct communicating from the float chamber, said duct being provided upon one side with an inlet air port.

6. In a carbureter of the described class, the combination of a mixing chamber, an inlet air chamber, a float chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float, an overflow duct communicating from the float chamber with the inclosing inlet air chamber, and a duct communicating from the bottom of said inlet air chamber with the inclosing mixing chamber.

7. In a carbureter of the described class, the combination of a mixing chamber, an inlet air chamber, a float chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float, an overflow duct communicating from the float chamber with the inclosing inlet air chamber, and a duct communicating from the bottom of said inlet air chamber with the inclosing mixing chamber, said overflow duct and said last named duct being provided with inlet air ports.

8. In a carbureter of the described class, the combination of a mixing chamber, an inlet air chamber supported from and located within the mixing chamber, a float chamber supported from and located partially within said inlet air chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float, a float rod communicating from the exterior of the mixing chamber with the float in said float chamber, spring actuated means for raising said rod and relieving said float and manually controlled means for compressing said spring and moving said rod downwardly against said float.

9. In a carbureter of the described class, the combination of a mixing chamber, an inlet air chamber supported from and located within the mixing chamber, said inlet air chamber being provided with a passage for the admission of air, a transverse opening for the reception of the float chamber, a perforated partition through and by which escaping air and vapor are commingled together, a float chamber supported from and located partially within said inlet air chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float.

10. In a carbureter of the described class, the combination of a mixing chamber, an inlet air chamber supported from and located within the mixing chamber, a float chamber supported from and located partially within said inlet air chamber, a float located in said float chamber, an inlet liquid duct communicating through said mixing chamber with said float chamber, a liquid controlling valve located within said duct, said valve being adapted to be normally opened by the passage of liquid in said duct and closed by the action of said float, and a safety valve located between the outlet duct of the carbureter and the exterior air, said valve being adapted to be opened by excessive pressure in said duct.

In testimony whereof I affix my signature in the presence of two witnesses.

HERMANN A. SEKOWSKY.

Witnesses:
 JAS. B. ERWIN,
 I. D. BREMER.